May 10, 1927.
G. A. ANDERSON
1,628,298
CAR TRUCK
Original Filed June 2, 1922   2 Sheets-Sheet 1
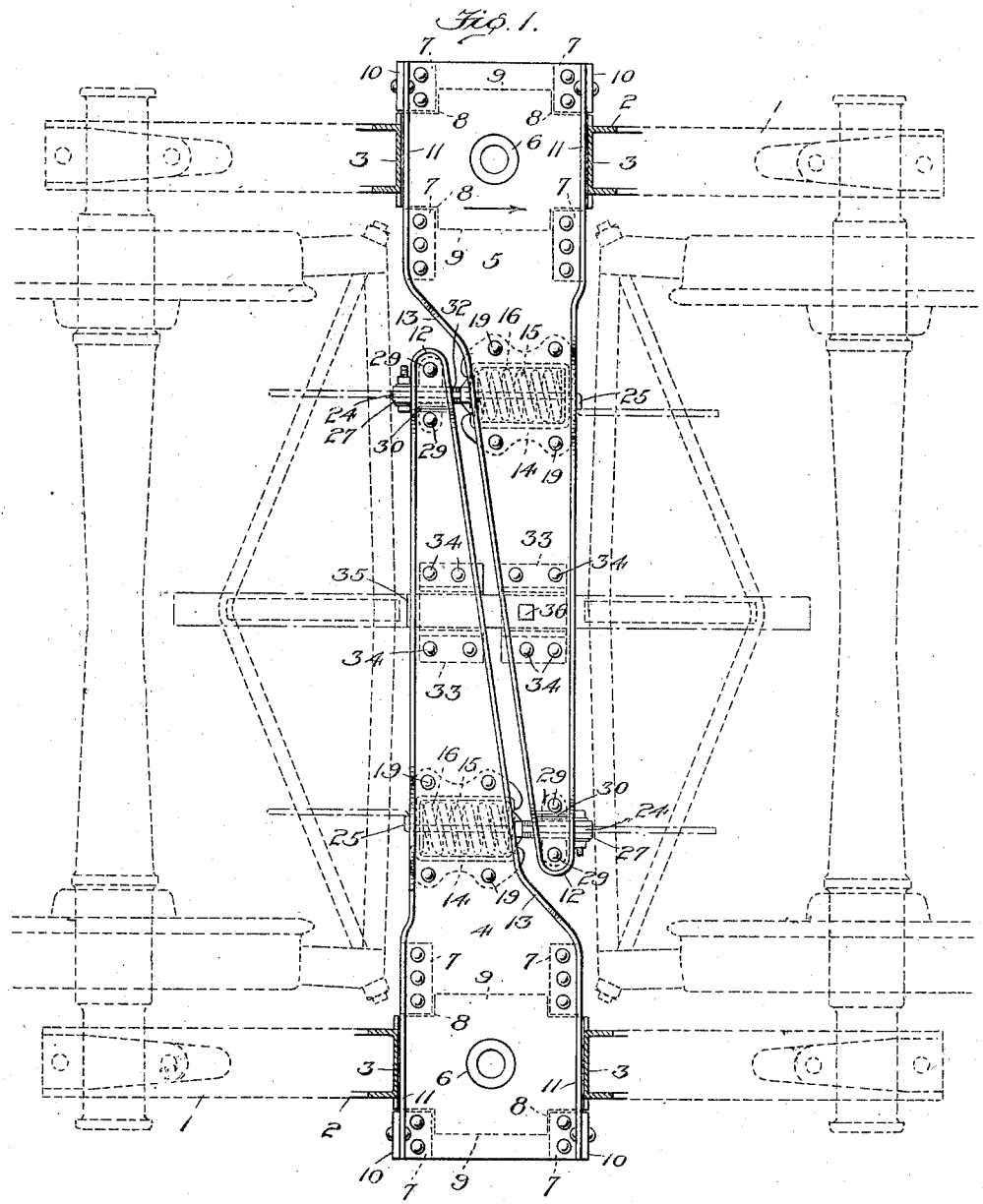
Witness
Edwin L. Bradford
Inventor
Gustaf A. Anderson
By
His Attorney May 10, 1927.
G. A. ANDERSON
CAR TRUCK
1,628,298
Original Filed June 2, 1922   2 Sheets-Sheet 2
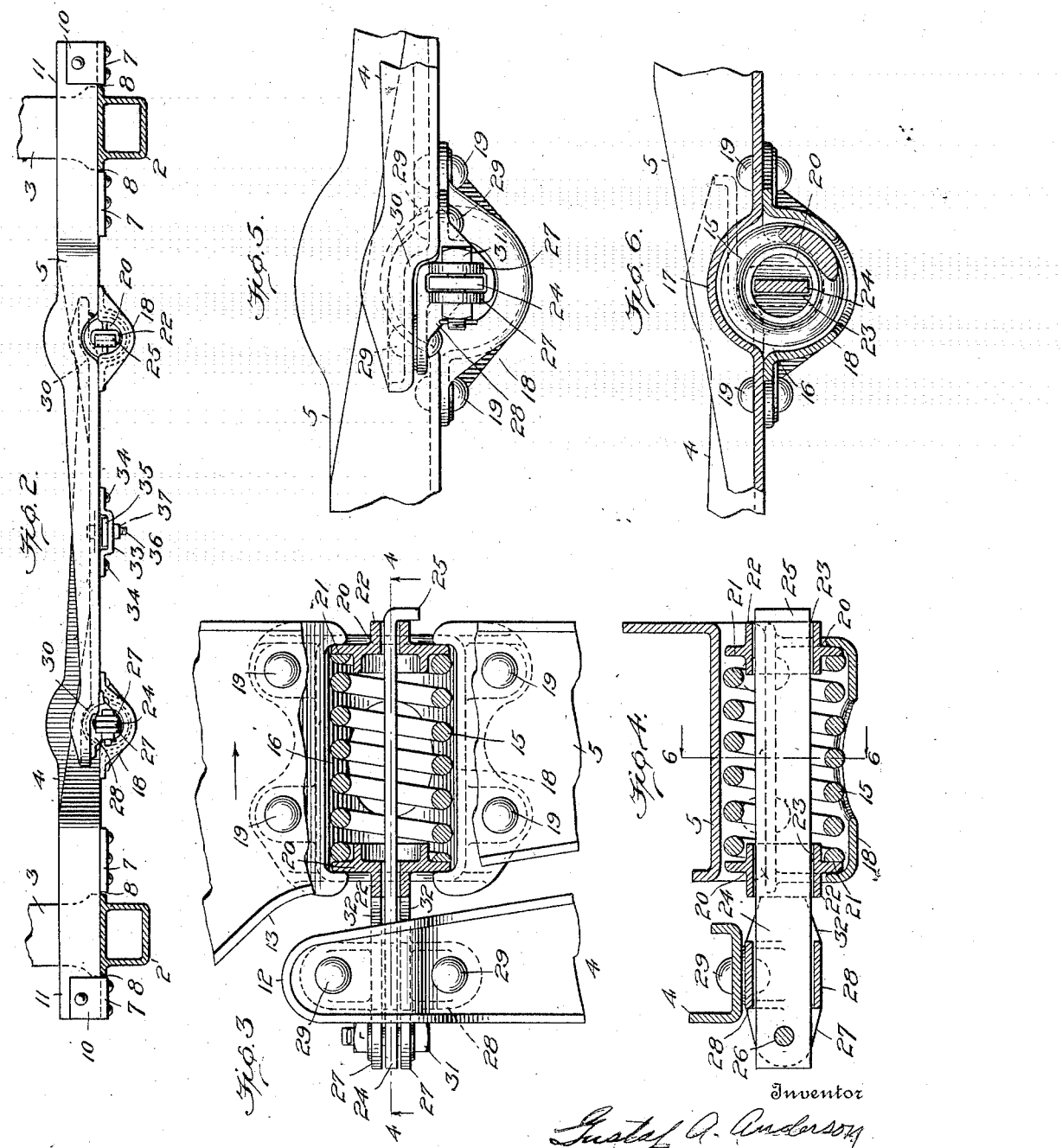
Witness
Edwin L. Bradford
Inventor
Gustaf A. Anderson
By Ernst F. Mechlin
His Attorney Patented May 10, 1927.

1,628,298

UNITED STATES PATENT OFFICE.

GUSTAF A. ANDERSON, OF BALTIMORE, MARYLAND, ASSIGNOR, BY MESNE ASSIGNMENTS, TO THE SYMINGTON COMPANY, A CORPORATION OF MARYLAND.

CAR TRUCK.

Application filed June 2, 1922, Serial No. 565,319. Renewed March 5, 1927.

My invention relates to car trucks and more particularly to a type of truck wherein the side frame members on opposite sides of the truck are connected in a manner permitting them to execute a yieldingly resisted relative movement longitudinally of the truck, thereby minimizing the shocks and strains transmitted to the structure incident to its passage around curves, over switch points or because of irregularities in the track or the truck wheels.

An object of the invention, generally stated, is to provide simple, durable and effective means for yieldingly maintaining the truck in square relation, said means including yieldingly separable complementary cross members connecting the side frames of the truck, and a yielding device for absorbing and cushioning the blows or shocks incident to displacement, said yieldable device acting to impart restoration movement to the side frames for returning them to normal position.

More particularly stated, the principal object of the invention is to provide a cross member in the form of a spring plank composed of separable complementary sections each of which is connected at one end to the respective frames and held rigidly therewith, and means yieldingly connecting said complementary sections, said means involving a plurality of spaced spring devices capable of being energized from either end and arranged for operation simultaneously when said complementary sections separate or move toward each other upon relative longitudinal movement of the side frame members.

Another object of the invention is to provide a truck having side frame members joined together by relatively associated rigid and yieldable means permitting relative longitudinal movement of the side frame members without swinging of the side frame connecting means, the yieldable portion of said means being adapted to restore the side frames to normal position upon cessation of the forces producing displacement movement.

A further object of the invention is to provide a plurality of longitudinally arranged yieldable devices connecting relatively longitudinally movable complementary sections of a cross member, said yieldable devices being adapted to be operated from each end by means carried by said complementary sections.

There are other objects of the invention residing in the particular features of construction and combination of parts as will hereinafter appear.

In the drawings which I have chosen for the purpose of illustrating the principle of the invention, the scope whereof is pointed out in the claims:

Figure 1 is a view partly in plan and partly in horizontal section of an embodiment of my invention applied to a car truck, shown conventionally in dotted lines, the bolster such as is ordinarily employed in flexible trucks being omitted and the parts being illustrated in normal square position.

Figure 2 is a partial transverse vertical sectional view through a car truck embodying my invention, the spring plank being shown in elevation.

Figure 3 is an enlarged detail plan view of a portion of the associated connecting members, one of said members being partly broken away to illustrate the yieldable device carried thereby and shown in horizontal section.

Figure 4 is a detail longitudinal vertical sectional view on the line 4—4 of Figure 3.

Figure 5 is an enlarged end elevation of a portion of the complementary members connecting the side frames.

Figure 6 is a detail transverse vertical sectional view on the line 6—6 of Figure 4.

In the preferred form of my invention illustrated in the drawings in which corresponding reference characters designate similar views in the several parts, the truck 1 is provided with the usual journal boxes, truck axles, brake shoes, and brake beams shown in dotted lines in Figure 1. These parts of the truck may be of the ordinary construction and form no part of my present invention.

The side frame members 2 are each provided with a bolster opening arranged between the columns 3 of the side frames, the means connecting said side frame members extending into and held within said openings and adapted to permit relatively longitudinal movement of the side frames.

In the type of flexible trucks embodying squaring mechanism, the usual cross connection uniting the side frame members may comprise the spring plank, bolster or similar cross member connected by means of pivot bosses provided in the side frame members and adapted to coact with corresponding pivot bearings formed in the spring plank. A swinging movement about such connections occurs upon displacement movement of the side frame members from normal square position, the spring plank or other connecting means moving into an angular position with relation to the side frames and acting, though slightly, to bring said side frames nearer each other, as will be understood.

In my present construction, the means uniting the side frames includes complementary sections 4 and 5, each of said sections having one end preferably connected to the pivot boss indicated at 6 but rigidly held against pivotal movement by a plurality of plates 7 riveted to the underside of the section so that contiguous edges of each plate fit within corner pockets 8 arranged adjacent the bolster opening. The corner pockets 8 are formed by projecting or continuing the supporting face of the side frames upon each side of the bolster opening, as at 9, and then interrupting said projecting portions short of the columns 3 so as to form the right angularly shaped pockets, as shown. In practice I prefer that the plate 7 substantially fill the respective pockets 8 and closely contact the same whereby relative rigidity is given to the respective sections 4 and 5 extending inwardly from the side frames. The outermost plates are preferably turned upwardly, as shown at 10, and riveted to the respective opposite side flanges 11 provided on the complementary sections. Each section of the cross connecting means extends inwardly of the frame and beyond the longitudinal center thereof, the end portion of said section in the form shown herein extending relatively close to the opposite side frame. The inwardly extending ends are arranged with their inner adjacent portions diagonally disposed and spaced apart, as shown, the outer end portions 12 of each tapering section terminating in respective offset portions 13 of the adjacent section so as to provide a connecting means, the outer opposite side edges of which extend substantially parallel across the truck. The complementary sections are designed to yieldingly move toward and away from each other longitudinally of the truck, the said inwardly extending portions maintaining their transverse substantially parallel relation.

The means for yieldingly maintaining said complementary sections in position for connecting the side frame members, includes a plurality of spring devices 14 and as each device is of similar construction a description will be given of but one. Each spring device comprises a coil spring 15 longitudinally disposed with relation to the truck and located within a spring pocket or recess 16 formed between a curved portion 17 pressed up from the transversely extending member and a cage or shell portion 18 connected to said member by means of rivets 19. The cage or shell 18 is provided at each end with a flange forming respective end walls for the spring pocket, and between said walls and the opposite ends of the spring are positioned followers 20 in the form of washers, as shown. Each follower 20 is provided with an annular flange seat 21 against which the spring normally rests, said spring being preferably positioned under initial compression in said pocket and between the followers contacting the end walls of the cage. A rectangular boss 22 is formed on each follower, a rectangular opening 23 extending through said boss and having passing therethrough a rod or bar 24, said bar constituting a connecting link between the complementary sections. One end 25 of the rod or bar 24 is bent over a follower boss on an adjacent section, the opposite end of said rod being pivotally connected at 26 between ears 27 provided on a bracket 28 connected to the opposite adjacent complementary section.

Each bracket 28 is connected to the underside of the complementary members by means of rivets 29, said bracket having its opposite ends offset, as clearly shown in Figure 5, to conform to the vertical offset 30 given to the end portion 12 of each inwardly extending complementary member, to provide a longitudinal center for the end connection of the link in horizontal alinement with the opposite end thereof. (See Figure 4.) A bolt and nut connection 31 secures the pivoted end of the bar 24 in place, a cotter serving to prevent the unfastening of said nut. The bracket 28 is further provided with projections 32 extending longitudinally toward the inner diagonal edges of adjacent complementary sections, the ends of said projections normally contacting opposite end portions of the rectangular boss when the truck side frames are in normal position. By this construction of the yielding device it will be seen that a positive connection is provided between the complementary sections sufficiently strong to effectively resist inconsequential shocks and blows, but also capable of yielding to displacement movement of the side frames caused by shocks and blows of a deforming nature met with in service conditions and operations.

Upon longitudinal separation of the complementary sections 4 and 5, and assuming that the side frame carrying the inwardly extending section 5 is disposed in the direction of the arrow thereon with respect to its complementary section 4, it will be seen that the follower contacting the end wall of the spring pocket adjacent the outer straight edge of said section is relatively held against movement by means of the connecting link 24, the spring 15 being compressed by reason of the advancing of the section 5 in the direction of the arrow, thereby causing the compression of said spring between the opposite followers and the spring pocket, the end wall adjacent the diagonal edge of the section acting as an abutment. When this occurs, the normal limiting contact between the projections 32 and the inner followers is broken, and remains so until the energized spring acts to return the parts to normal position.

The opposite spring device upon displacement movement aforesaid causes the end portion 12 of the section or member 5 to move away from its complementary section, the connecting link 24 connected to the bracket 28 on said end portion acting to cause the energization of the spring by pulling the outer follower against the spring in said pocket, as will be understood. In the event of displacement movement causing the complementary members 4 and 5 to approach each other, the respective projections 32 normally contacting the ends of the respective inner follower of each spring device, are moved against the tensions of the respective springs, each opposite end wall adjacent the respective straight edges of said complementary member acting as an abutment, the respective connecting link 24 sliding through the opening provided in each follower, as will be understood. Upon displacement movement simultaneously transmitted to each side frame, it will be obvious that the springs are differentially compressed from each end.

When a truck constructed in accordance with my present invention is subjected to a force causing one or both side frames to move relatively of each other, the springs 15 carried in the respective cages or pockets will be compressed as long as the distorting force overcomes the predetermined initial compression of said springs. The amount of compression of the spring will, of course, be dependent upon the intensity of the force operating to displace the side frames 2 from normal position. It will be apparent that immediately upon the diminution of the distorting force the side frames and the inwardly extending complementary sections of the cross connecting means will move toward normal position, and that they will completely resume such normal position when the distorting force disappears.

The spring devices and associated parts by which the truck members are yieldingly retained in normal or square position are of a nature permitting them to be so located that they are well protected from accidental injury and do not interfere with the other necessary parts with which trucks are commonly provided. The cross connecting means connecting the side frame members is preferably provided with two of said yieldable devices located respectively upon opposite sides of the longitudinal center of the truck, although it will be understood that my invention is not limited to the number of yielding devices shown or to their exact location.

The connecting means and more particularly each complementary section is provided transversely of the truck at an intermediate point with a depending bracket 33 connected to the underside of each respective section by means of rivets 34, guide openings being provided in said brackets and cooperating with means for guiding the complementary sections longitudinally and maintaining them in relative transverse position substantially free from lateral movement. A bar 35 extends into the respective openings in each bracket, one end of said bar being connected to the bracket by means of a bolt 36 passing through the web of the section 5, the bar 35 and bracket 34, and provided with a nut 37, as shown. The opposite end of the bar is freely mounted within the bracket provided on the section 4, and in normal position projects slightly beyond the outer straight edge of said section. (See Figure 1.) This construction located intermediate the spring devices and preferably on the longitudinal center of the truck serves to guide and maintain complementary sections of the cross connecting means in associated relation without placing undue lateral and other strains upon said spring devices.

The opposite ends of the bar 35 may be extended, as shown in dotted lines in Figure 1, said extensions serving as safety points of support for the brake beams and associated strut. Similarly the opposite ends of each rod or bar 24 may be extended, as shown in dotted lines in Figure 1, for providing safety points of support for the respective brake beams.

I claim:—

1. In a car truck, the combination with longitudinally movable side frame members, of means connecting said side frame members, said means including inwardly extending cooperating portions rigidly carried by said side frame members, and yieldable means connecting said cooperating portions upon opposite sides of the longitudinal center of the truck, said yieldable means being energized upon displacement of the side frame members from normal position and acting to restore said side frame members to normal position upon cessation of the force producing displacement.

2. In a car truck, the combination with longitudinally movable side frame members, of means involving complementary sections for connecting said side frame members, said complementary sections being rigidly held at one end to an adjacent side frame member, and yieldable means connecting the opposite ends of said complementary sections.

3. In a car truck, the combination with longitudinally movable side frame members, of means connecting said side frame members, said means including inwardly extending cooperating portions, each of said portions being rigidly connected at one end to an adjacent side frame, and yieldable means associated with the opposite unconnected end of said inwardly extending portion, said yieldable means being adapted to be energized upon displacement of the side frame members from normal position and acting to restore said side frame members to normal position upon cessation of the forces producing displacement.

4. In a car truck, the combination with longitudinally movable side frame members, a cross member formed of complementary sections connecting said side frame members, and yieldable means associated with said cross member, said yieldable means being located without the longitudinal center of said truck and adapted to be energized upon displacement of either or both of said side frame members.

5. In a car truck, the combination with longitudinally movable side frame members, of means connecting said side frame members, said means including complementary sections each of which is rigidly connected at one end to an adjacent side frame member, and means located adjacent the unconnected ends of the respective complementary sections for resisting displacement movement of the side frame members.

6. In a car truck, the combination with longitudinally movable side frame members, of means connecting said side frame members, said means including complementary sections each of which is rigidly connected at one end to an adjacent side frame member, and means carried by each complementary section for resisting displacement movement of the side frame members, said means being associated with and attached to the ends of the complementary sections.

7. In a car truck, the combination with longitudinally movable side frame members, of means connecting said side frame members, said means including inwardly extending complementary sections, means including a plurality of spring devices yieldingly connecting said complementary sections, and means for guiding said sections longitudinally of the truck upon displacement movement from normal position, said guiding means being located intermediate the spring devices.

8. In a car truck, the combination with longitudinally movable side frame members, of means connecting said side frame members, said means including inwardly extending complementary sections, means including a plurality of spring devices yieldingly connecting said complementary sections, and guide means provided on each complementary section, said guide means including a guide member connected to one of said complementary sections and movable with respect to the other of said sections, said guide member being arranged intermediate said spring devices.

9. In a car truck, the combination with longitudinally movable side frame members, of means connecting said side frame members, said means including inwardly extending complementary sections, means including a plurality of spring devices yieldingly connecting said complementary sections, and means for guiding said sections longitudinally of the truck, said means serving to maintain the complementary sections in position and located centrally of the truck.

10. In a car truck, the combination with longitudinally movable side frame members, means connecting said side frame members, said means including inwardly extending complementary sections, and means including a plurality of spring devices yieldingly connecting said complementary sections, said spring devices being arranged parallel and operated simultaneously upon displacement of the truck side frame members from normal position.

11. In a car truck, the combination with longitudinally movable side frame members, means connecting said side frame members, said means including inwardly extending complementary sections, and means including a plurality of spring devices yieldingly connecting said complementary sections, said spring devices being arranged in parallel and adapted to be operated from either or both of the respective ends of said spring devices.

12. In a car truck, the combination with longitudinally movable side frame members, means including a sectional spring plank connecting said side frame members, means for maintaining the respective sections of said spring plank rigid with adjacent side frame members, and means yieldingly connecting the respective sections of the spring plank for resisting displacement movement of said side frame members.

13. In a car truck, the combination with longitudinally movable side frame members, of means including a spring plank connecting said side frame members, said spring plank being formed of separable sections each having an end rigidly connected to an adjacent side frame member, and means yieldingly connecting said separable sections of the spring plank.

14. In a car truck, the combination with longitudinally movable side frame members, of means connecting said side frame members, said means including a spring plank formed of separable sections, means including a plurality of plates rigidly connecting one end of each of said separable sections to an adjacent side frame member, and means yieldingly connecting the respective opposite ends of said separable sections to an adjacent section of the spring plank.

15. In a car truck, the combination with longitudinally movable side frame members, of means connecting said side frame members, said means including a spring plank formed of separable sections, means for rigidly connecting one end of each of said separable sections to an adjacent side frame member, and spring means connecting said separable sections of the spring plank.

16. In a car truck, the combination with longitudinally movable side frame members, of means connecting said side frame members, said means including a spring plank formed of separable sections, means connecting one end of each of said separable sections to an adjacent side frame, and yieldable means located relatively near each of said side frames, said yieldable means being energized upon displacement of the side frame members from normal position and acting to restore said side frame members to normal position upon cessation of the force producing displacement.

17. In a car truck, the combination with longitudinally movable side frame members, of means connecting said side frame members, said means including cooperating members each having one end rigidly connected to an adjacent side frame and the other end thereof arranged relatively close to an opposite side frame member, and means connecting each inwardly extending end of each member to an adjacent member, said means being adapted to resist displacement movement of the side frame member and acting to restore the displaced side frame member to normal position upon cessation of the force producing displacement.

18. In a car truck, the combination with side frame members and means connecting said side frame members, said means including cooperating inwardly extending members each having one end thereof connected to an adjacent side frame and the other end thereof yieldingly associated with an adjacent inwardly extending member.

19. In a car truck, the combination with longitudinally movable side frame members, of means including a sectional spring plank connecting said side frame members, and yieldable devices carried by certain of said sections and connected to an adjacent section of said spring plank, said yieldable devices being operable from both ends thereof for resisting displacement of the side frame members and acting to restore said side frame members to normal position.

20. In a car truck, the combination with longitudinally movable side frame members, of means including a sectional spring plank connecting said side frame members, and yieldable means carried by one section of the spring plank and connected to an adjacent section thereof, said yieldable means including a spring assembled under initial compression and operable from either one or both ends thereof for resisting displacement movement of the side frame members and acting to restore said side frame members to normal position.

21. In a car truck, the combination with longitudinally movable side frame members, of means including a sectional spring plank connecting said side frame members, and yieldable means carried by one section of the spring plank and connected to the adjacent section thereof, said yieldable means including a spring pocket and spring positioned therein, and means connecting the opposite ends of said spring with said adjacent section of the spring plank whereby said spring is energized upon displacement movement of the side frame member for resisting and subsequently restoring said side frame member to normal position upon cessation of the force producing displacement.

22. In a car truck, the combination with longitudinally movable side frame members, of means including a sectional spring plank connecting said side frame members, and yieldable means carried by one section of the spring plank and connected to an adjacent section thereof, said yieldable means including a spring, a follower at each end of said spring and means associated with each of said followers and carried by the adjacent section of the spring plank for energizing said spring upon displacement of either one or both of said side frame members.

23. In a car truck, the combination with longitudinally movable side frame members, of means including a sectional spring plank connecting said side frame members, and yieldable means carried by one section of the spring plank and connected to an adjacent section thereof, said yieldable means including a spring, a follower at each end of said spring, a link connecting one follower with the adjacent section of the spring plank, and means carried by said adjacent section and associated with the other of said followers whereby the spring is energized from either one or both ends of the spring independently or simultaneously.

24. In a car truck, the combination with longitudinally movable side frame members, of means including a sectional spring plank connecting said side frame members, and yieldable means carried by one section of the spring plank and connected to an adjacent section thereof, said yieldable means including a spring, a follower at each end of said spring, a link connecting one follower with the adjacent section of the spring plank, and means carried by said adjacent spring plank and contacting the opposite follower for energizing the spring when the sections of the spring plank are moved toward each other.

25. In a car truck, the combination with side frame members which are relatively movable longitudinally of the truck, of means for movably connecting said side frame members including a yieldable device located longitudinally of the truck, and means for energizing said yieldable device upon longitudinal displacement of said side frame members in either direction from normal position.

26. In a car truck, the combination with side frame members, of means movably connecting said side frame members including inwardly extending members provided on said side frame members and relatively movable with respect to each other upon displacement of either of said side frame members from normal position, and means arranged between said relatively movable inwardly extending members for resisting displacement movement of the side frame members from normal position.

27. In a car truck, the combination with side frame members, of means movably connecting said side frame members including a member carried by each side frame and relatively movable with respect to an adjacent member carried by the other side frame upon displacement movement of either of said side frames from normal position, and a yieldable device supported between said members under initial compression and adapted to be energized from either end thereof upon displacement of the side frames from normal position.

28. In a car truck, the combination with side frame members, of a spring plank construction movably connecting said side frame members including inwardly extending members carried by said side frame members, and a yieldable device positioned between said inwardly extending members and adapted to resist displacement movement of the side frame members from normal position.

29. In a car truck, the combination with side frame members and a spring plank connection movably uniting said side frame members, said spring plank connection including a plurality of spring devices, said connection operating to energize said spring devices upon displacement movement of either or both of said side frame members from normal position.

30. In a car truck, the combination with side frame members, of means movably connecting said side frame members including a yieldable device arranged intermediate the ends of said connecting means, means for energizing said yieldable device upon displacement of a side frame member from normal position, said means also serving to support said yieldable device.

In testimony whereof I affix my signature.

GUSTAF A. ANDERSON.